United States Patent [19]

Lewis

[11] 4,336,656
[45] Jun. 29, 1982

[54] METHOD AND APPARATUS FOR POSITIONING A TAPERED MEMBER TO VERIFY THE ACCURACY OF THE TAPER

[75] Inventor: H. Glenn Lewis, Westland, Mich.

[73] Assignee: Sandvik AB, Sandviken, Sweden

[21] Appl. No.: 157,844

[22] Filed: Jun. 9, 1980

[51] Int. Cl.$^3$ .......................... G01B 3/56; G01B 5/24
[52] U.S. Cl. .................................................. 33/174 E
[58] Field of Search ............. 33/172 R, 174 E, 174 H, 33/174 Q

[56] References Cited

U.S. PATENT DOCUMENTS

| | | | |
|---|---|---|---|
| 1,555,883 | 10/1925 | Schlaupitz | 33/174 E |
| 2,412,569 | 12/1946 | Dugger | 33/174 E |
| 2,551,471 | 5/1951 | Snow | 33/174 E |
| 2,895,222 | 7/1959 | Rueb | 33/174 E |
| 3,115,705 | 12/1963 | Whiteman | 33/174 E |
| 3,845,567 | 11/1974 | Johnson | 33/174 E |
| 4,106,205 | 8/1978 | Wiederkehr | 33/174 E |

FOREIGN PATENT DOCUMENTS

| | | | |
|---|---|---|---|
| 400770 | 8/1924 | Fed. Rep. of Germany | 33/174 E |
| 951236 | 10/1956 | Fed. Rep. of Germany | 33/174 E |
| 426283 | 6/1967 | Switzerland | 33/174 E |
| 242419 | 4/1969 | U.S.S.R. | 33/174 E |

*Primary Examiner*—Richard R. Stearns
*Attorney, Agent, or Firm*—Burns, Doane, Swecker & Mathis

[57] ABSTRACT

The present invention relates to a method and apparatus for positioning a tapered member so that the taper of a tapered surface thereof can be verified. The apparatus comprises a first surface having an angle with respect to the horizontal which is equal to the included angle of the shaft to be measured. A vertical surface having an angle equal to one half the included angle of the shaft to be measured is arranged along one edge of the first surface. A plurality of horizontal gauge block surfaces are arranged at predetermined vertical heights with respect to the base of the first angled surface. A gauge block, whose size is determined by the particular shaft to be measured, is secured to an appropriate gauge block surface so that a gauge can be preset to zero with reference to an upper horizontal gauge surface of the gauge block. Thereafter, the member to be measured is placed with the tapered surface resting against the two angled surfaces. The gauge is then moved along an upper portion of the tapered surface to obtain a reading. The readings obtained on the upper portion of the tapered surface of the member are compared with the preset value obtained at the gauge surface to determine whether the taper has been properly machined.

18 Claims, 8 Drawing Figures

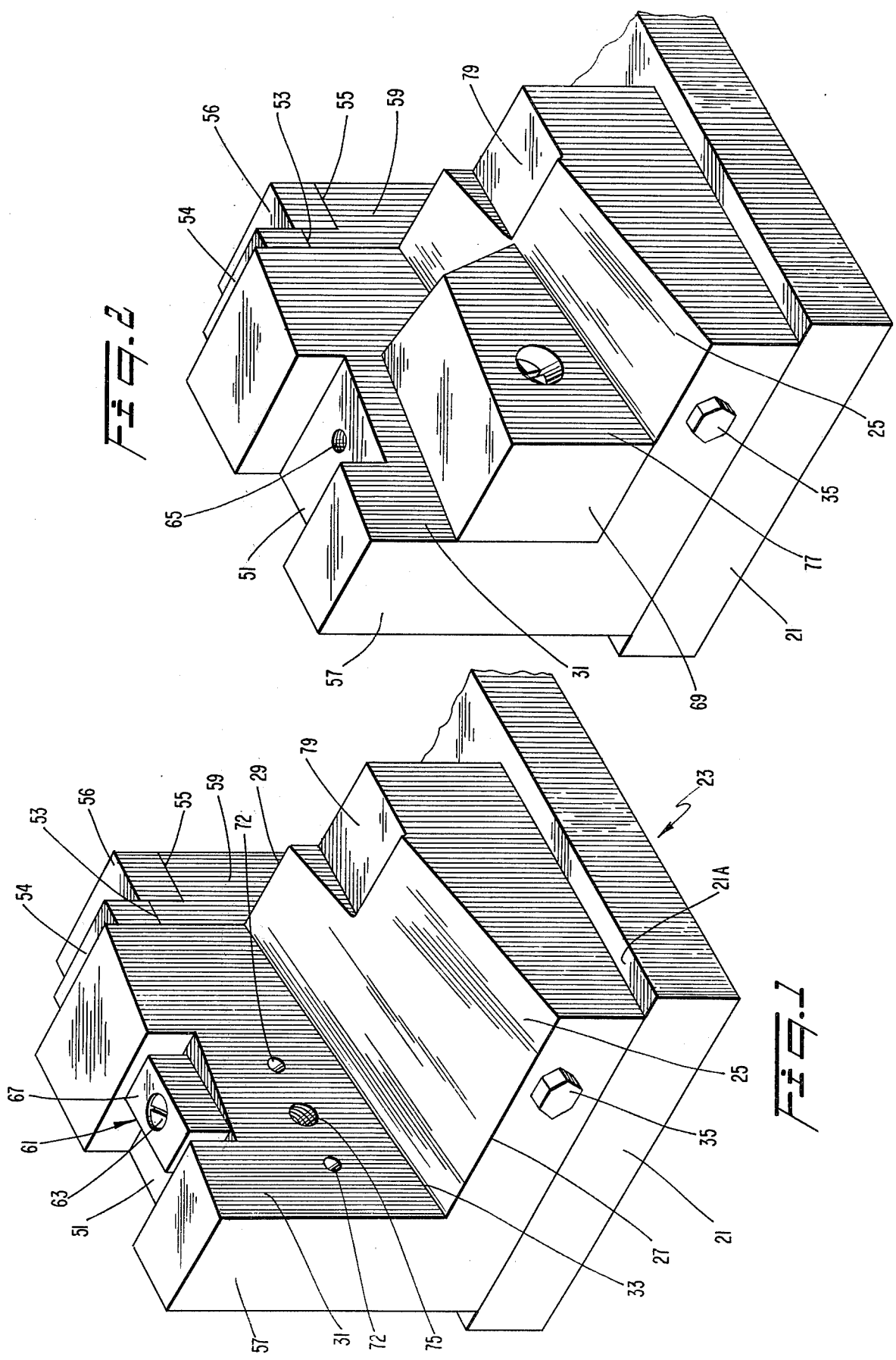

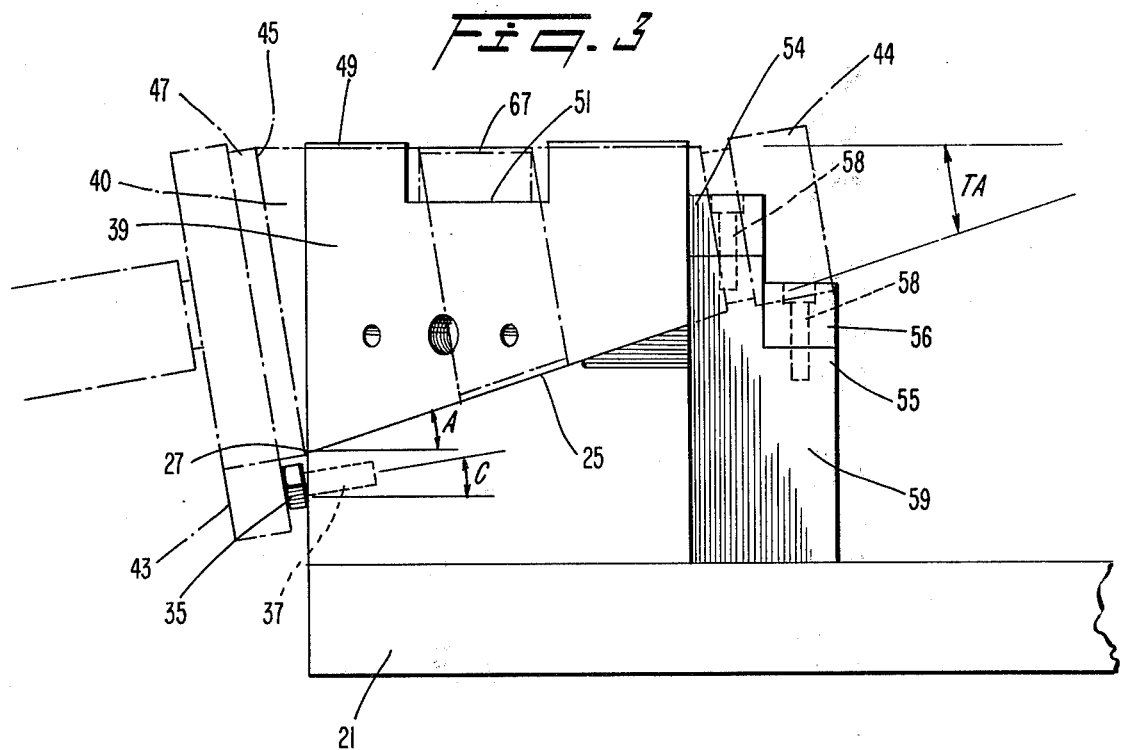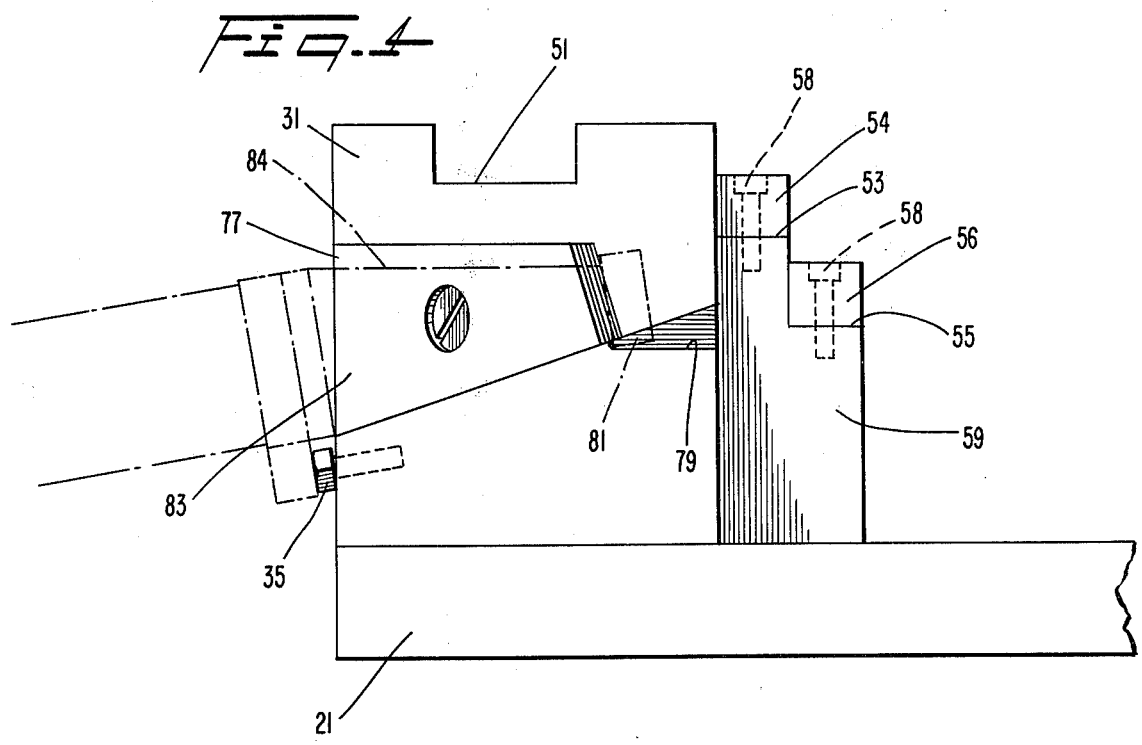

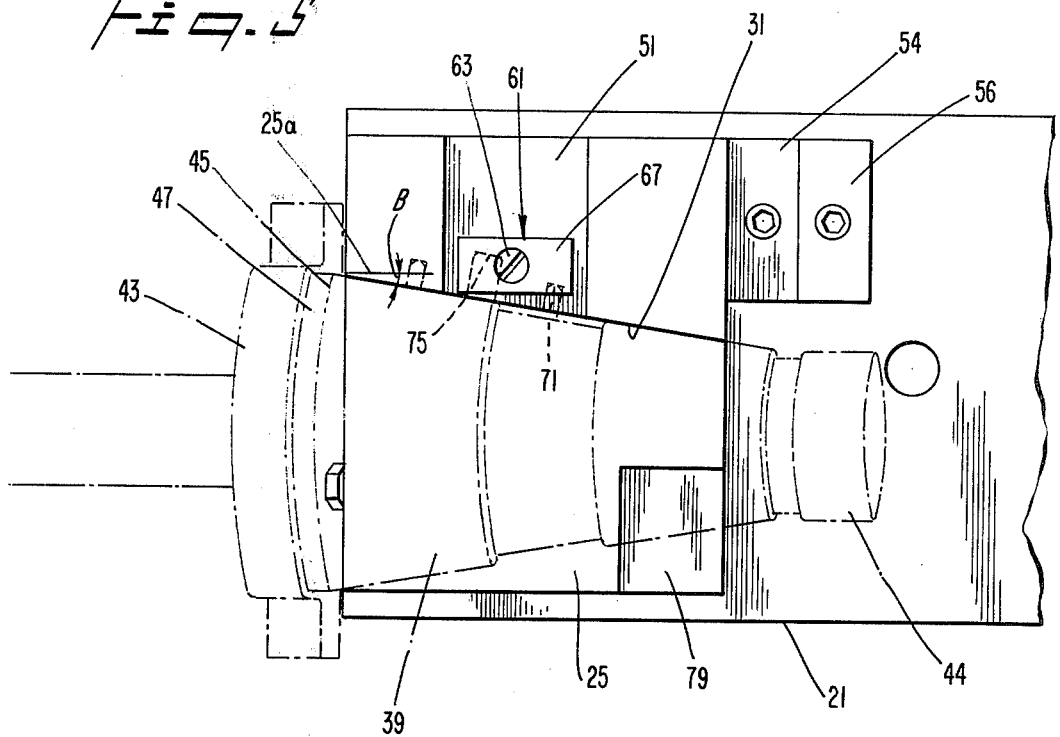
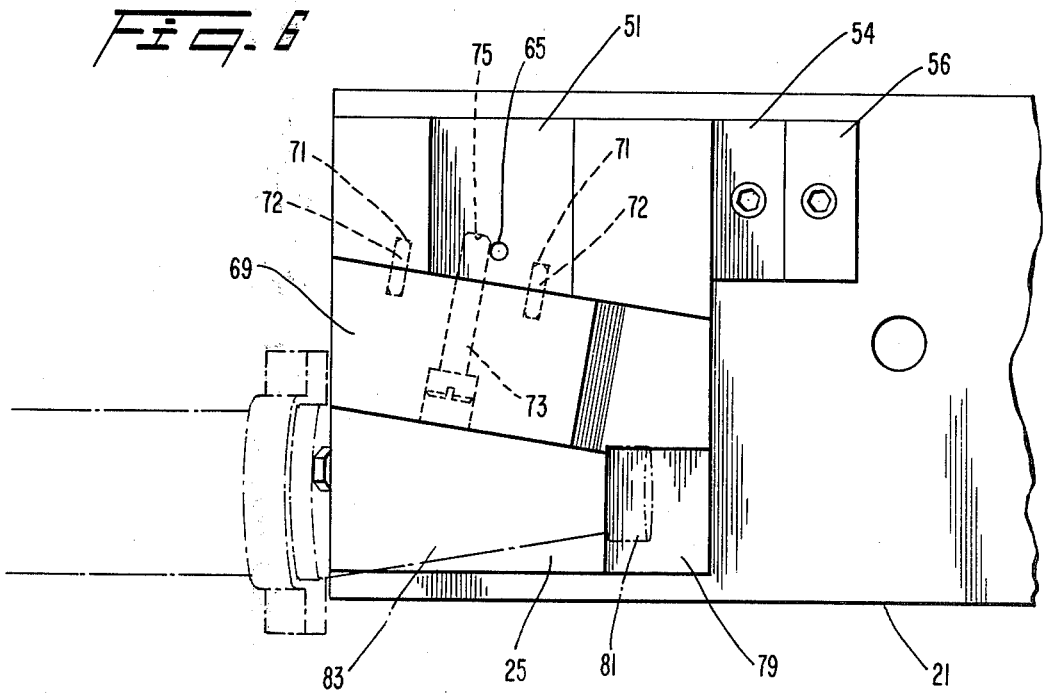

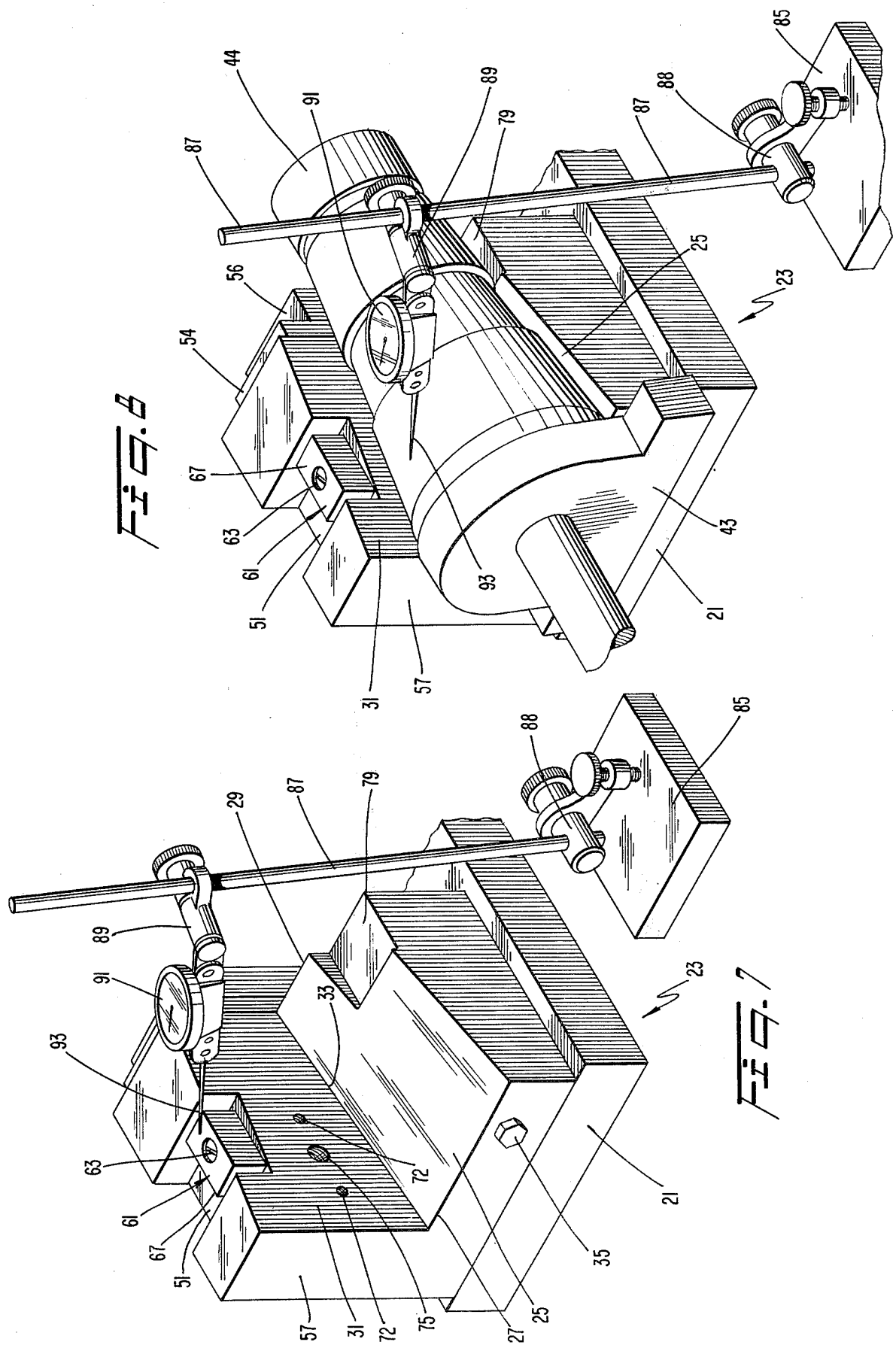

METHOD AND APPARATUS FOR POSITIONING A TAPERED MEMBER TO VERIFY THE ACCURACY OF THE TAPER

BACKGROUND AND SUMMARY OF THE PRESENT INVENTION

The present invention relates to a method and apparatus for positioning a tapered member to verify the accuracy of the taper.

When machining and grinding a shaft having a continuous taper it is desirable to provide a simple and convenient apparatus for checking or verifying that the shaft has been ground smoothly to the proper angle of taper. This is particularly true when providing tapered shafts for tool shanks whose use requires that they be machined within very close tolerances. Various prior art devices have been proposed to measure or check the taper of a shaft or a bore hole. However, none of these prior devices has been found to be a simple and efficient as desired for use on a regular basis when producing a large quantity of tapered shafts.

On such prior device is disclosed in U.S. Pat. No. 2,551,471 issued to Snow. The Snow patent discloses a gauge comprising a block provided with a laterally extending top portion and an upwardly curved portion adapted to follow the outer contour of a tapered bearing race. When the tapered bearing race has been placed in the block, a pair of feeler pads attached to a pair of spaced apart gauges are lowered until they contact the surface of the bearing. The feelers simultaneously impart their position to the respective indicating fingers on a single calibrated dial face. If the indicating fingers are both within a predetermined tolerance range, the diameters of the tapered bearing race are acceptable. A further scale is provided to determine the spacing between the two indicating fingers. A device of this type would require a relatively complex set of rods and gears in order to compare the relative positions of the two indicating fingers on the single dial face. In addition, the machining of the support block would be difficult since the block itself comprises a portion of a tapered bore.

U.S. Pat. No. 3,845,567 issued to Johnson discloses a device for checking the taper of a keyway in a bore. The device comprises a fixed tapered surface which limits the movement of the device into the keyway and a second movable tapered surface. By sliding the second surface into the keyway it can be determined if the taper of the keyway is too large or too small. A device of this type, however, could not be used to determine whether the outside taper of a shaft were ground to the proper dimensions.

Other prior art devices ae disclosed in U.S. Pat. No. 3,115,705 and 4,106,205 issued to Whiteman and Wiederkehr, respectively. The Wiederkehr patent relates to an apparatus for measuring inside and outside chamfers on work pieces but a device of this type could not verify an elongate taper of a shaft. The Whiteman patent teaches a gauge for measuring the angle of a tapered face of a work piece by precisely measuring tangent quantities of inclinations, but a device of this type could not be employed for relatively rapid measurements.

Accordingly, it is an object of the present invention to provide a method and apparatus for positioning a tapered member to verify the taper in a simple, efficient and rapid manner.

A further object of the present invention is to provide a method and apparatus which positions and verifies the taper of a member along its entire length without involving a resetting of a gauge or a changing of the position of the shaft.

A still further object of the present invention is to provide an apparatus which is readily adaptable to verify the taper of members of different diameters.

These and other objects are accomplished according to the present invention by providing an apparatus for use with a gauge which comprises a first surface and a second surface having an angle relative to a longitudinal axis of the first surface equal to one half the included angle of the taper of the member to be measured arranged along one side of the first surface. A tapered surface of the tapered member is positioned against the first and second surfaces and, if the tapered surface corresponds to the desired taper, a longitudinal axis of the first surface is coplanar with a centerline of the member and a portion of the tapered surface remote from the first surface is disposed at a preselected level.

In a preferred embodiment, the apparatus is arranged horizontally and a plurality of horizontal gauge block surfaces are arranged at predetermined vertical heights with respect to a base of the first surface. A plurality of gauge blocks are provided whose size is determined by the largest diameter of the particular member or shaft to be verified. An appropriate gauge block is placed on an appropriate gauge block surface so that a dial indicator can be preset to zero with reference to an upper, horizontal gauge surface of the gauge block.

In operation of the present invention, the tapered member to be verified is placed against the two angled surfaces. The dial indicator, after having been preset to zero on the appropriate gauge surface, is then placed at various locations on an upper portion of the tapered surface along the length of the member to obtain a reading. These readings are compared with the preset zero reading obtained at the appropriate gauge surface to determine whether the taper has been properly ground and machined. If the dial indicator reads zero at the various locations along the member, the member has been ground to the proper taper.

In a further preferred embodiment of the present invention, a rest button is arranged beneath an edge of the first surface against which a flange on the tapered member is placed. Also, by verifying that the tapered surface is accurately ground at both ends thereof, the gauge line to flange dimension is also verified by the present invention.

A further preferred embodiment of the present invention, includes a spacer block which redefines the second surface along the first surface to allow the taper of smaller diameter members to be verified in the apparatus. Also, a relief is cut in the first surface in order to receive a cylindrical end of a shaft and to assure that portions of the tapered surface of the member lie flush against the two surfaces.

BRIEF DESCRIPTION OF THE DRAWINGS

Preferred embodiments of the method and apparatus for positioning a tapered member to verify the taper according to the present invention will be described with reference to the accompanying drawings wherein like members bear like reference numerals and wherein:

FIG. 1 is a perspective view of a taper verifying device according to the present invention;

FIG. 2 is a perspective view similar to FIG. 1 with a spacer block in place;

FIG. 3 is a side elevational view of the apparatus of FIG. 1 with a tapered member in place;

FIG. 4 is a side elevational view of the apparatus of FIG. 2 with a smaller diameter tapered member in place;

FIG. 5 is a top view of FIG. 3;

FIG. 6 is a top view of FIG. 4;

FIG. 7 is a perspective view of an apparatus according to the present invention with a gauge in place; and FIG. 8 is a perspective view similar to FIG. 7 with the gauge and a tapered member in place.

DETAILED DESCRIPTION OF THE PREFERRED EMBODIMENTS

With reference to FIG. 1, a base 21 upon which the apparatus of the present invention is secured rests upon a table or other flat, level surface 23. A first angled surface 25 is arranged on a flat surface 21A of the base 21 and forms a first acute angle A with the horizontal (FIG. 3), the angle A being equal to the included angle TA of a tapered member to be measured (FIG. 3). The first angled surface 25 increases uniformly in height above the base 21 at the angle A from a first horizontal edge 27 of the angled surface 25 to a second horizontal edge 29 of the surface 25.

A second angled surface 31 is arranged perpendicular to the base 21 and extends along a first side 33 of the first angled surface 25. The second angled surface 31 forms a second acute angle B with a longitudinal axis 25a of the first surface 25 (FIG. 5). The angle B is equal to one half the included angle of the tapered shaft to be measured, i.e., angle B is equal to the angle formed by the taper and the centerline or longitudinal axis of the shaft. Thus, the longitudinal axis 25a may be defined as an imaginary line of the first surface 25 which is coplanar with the centerline of the shaft when the tapered surface is placed in contact with both surfaces 25, 31. In the preferred embodiment, the first edge 27 of the first surface 25 is oriented perpendicular to the longitudinal axis 25a of the first surface 25.

A rest button 35 is arranged beneath the first edge 27 of the first angled surface 25. In a preferred embodiment, the rest button comprises an adjustable bolt having a hexagonal head which is secured in a tapped hole 37 beneath the first edge 27 of the surface 25. As seen in FIG. 3, the rest button bolt 35 is arranged at an angle C with the horizontal (FIG. 3). The angle C is equal to one half the included angle of the tapered shaft to be measured for the reasons set forth below.

With reference to FIGS. 3 and 5, a tapered shaft member 39, which includes a tapered surface 40, is placed against the two angled surfaces 25, 31, respectively, in contact with both surfaces along the length of the shaft 39. The shaft carries a flange 43 at the large or inner end of the tapered shaft 39 and a cylindrical section 44 at the small or outer end of the shaft 39. The flange 43 abuts the rest button 35. The angle C at which the rest button 35 is arranged assures that the flange 43 lies flush against the head of the rest button 35. As can be seen, by providing a bolt for use as the rest button 35 the rest button 35 can be adjusted if desired to accommodate tapered members of different diameters or unusual shapes. It should be noted that the rest button 35 can be eliminated if the shaft being verified does not include a flange.

By arranging the tapered shaft against the two angled surfaces 25, 31 and the rest button 35, the shaft will be properly positioned for verifying the taper of the shaft.

If the shaft has been ground to the proper taper, the crest, e.g., uppermost portion, 49 of the tapered shaft, remote from the first surface, will lie in a horizontal plane at a preselected height since the angle of the surface 25 is equal to the included angle of the taper of the shaft to be measured. Also, if the taper is accurate, the second angled surface 31 assures that the longitudinal axis of the shaft is coplanar relative to the axis 25a of the surface 25. As a result, the shaft is properly positioned and oriented to have its taper detected by a gauge.

As described in more detail below, the taper is verified upon placing the tapered surface so that it contacts the surfaces 25, 31. It will become apparent that the first surface 25 contains a longitudinal axis 25a which axis (or a line parallel thereto) is coplanar with a longitudinal axis of the shaft being measured when the shaft taper is accurate. This coplanar relationship is created because the second surface 31 forms with the axis 25a the angle B which is equal to one half the included angle of the taper.

Again with reference to FIG. 1, a plurality of horizontal gauge block surfaces 51, 53, 55, are arranged at varying vertical heights above the first surface 25. The gauge block surface 51 is arranged in a vertical section 57 of the apparatus which includes the second angled surface 31 as one face thereof. The gauge block surfaces 53, 55 are arranged in a second vertical section 59 spaced from the two angled surfaces. A gauge block 61 is secured to the gauge block surface 51 by a bolt 63 which is screwed into a tapped hole 65 in the vertical section 57. The heights of the gauge block surfaces are different from one another and less than the maximum diameter of a properly ground tapered shaft which is to be verified using that particular gauge block surface as explained below.

The gauge block 61 is carefully machined so that a horizontal upper gauge surface 67 of the gauge block 61 lies a predetermined vertical height above the angled surface 25 when the gauge block 61 is secured to the gauge block surface 51, which height corresponds to the diameter of a gaugeline 45 of the tapered shaft, i.e., to the expected uppermost portion 49 of the shaft when the latter is placed on the surface 25. The gauge line 45 is a circular edge defined by the junction of a cylindrical portion 47 of the shaft and the tapered surface 40.

Other suitable gauge blocks 54, 56 (FIG. 4) are arranged to be attached to the gauge block surfaces 53, 55 respectively by bolts 58. Each of the gauge blocks has a horizontal upper gauge surface which lies a predetermined vertical distance above the first edge 27 of the first angled surface 25 which corresponds to the uppermost portion of the tapered shaft to be measured using the particular gauge block surface and gauge block.

With reference to FIGS. 7 and 8, a gauge and gauge support are provided. The support comprises a stand 85 upon which a support shaft 87 is pivotally mounted at a pivot 88 of any suitable design. The stand 85 is arranged upon the level surface 23 or perhaps on an extension of the base 21. It is necessary that the surface on which the stand sits be parallel with the orientation of the uppermost portion 49 of the tapered surface, i.e., horizontally in the preferred embodiment.

Arranged along the support shaft 87 is a collar 89 which pivotally mounts a dial indicator gauge 91 and a stylus 93 on the support shaft 87. The dial indicator gauge is of a conventional design. When the stylus 93 is placed on a surface the dial indicates the deflection of the stylus. The indicator can be conveniently set to zero to any desired reference. A suitable gauge of this type is manufactured by Interapid and has a useful operating range of approximately 0.060 inches of deflection and a resolution of 0.0001 inches.

After securing the collar 89 at an appropriate height and angle, the stylus 93 is placed in contact with the upper horizontal gauge surface 67 of the gauge block 61 attached to gauge block surface 51 (FIG. 7), After appropriately presetting the dial indicator gauge 91 to zero on the upper gauge surface 67, the stylus 93 is moved to contact the upper portion 49 of the tapered shaft 39 (FIG. 8). If the upper portion 49 of the shaft is disposed at the same level as the surface 67, then the gauge 91 reads zero as the stylus 93 and gauge 91 are slid along the upper portion 49.

In operation, and with reference to FIGS. 1, 3, 5, 7 and 8, when the uppermost diameter of the member whose taper is to be verified is determined, in this example shaft 39, the appropriate gauge block 61 is secured by the bolt 63 to the appropriate gauge block surface 51. The stylus 93 on the dial indicator gauge 91 is placed in contact with the upper horizontal gauge surface 67 of the gauge block 61 to vertically locate the stylus. The dial indicator is then preset to zero with reference to the gauge surface 67.

The tapered shaft 39 is then placed in the apparatus of the present invention such that the tapered surface 40 of the shaft lies against the first angled surface 25 and the second angled surface 31 and the flange 43 on the shaft 39 abuts the rest button 35. The stylus 93 of the dial indicator gauge 91 is then moved and arranged such that the probe contacts the upper portion 49 of the shaft 39. The stylus 93 is moved along the upper portion 49 of the shaft 39 and the readings obtained therefrom are compared to the zero reading preset on the gauge surface 67 of the gauge block 61. If the readings obtained from the upper surface 49 of the shaft coincide with the readings obtained from the upper gauge surface 67 as the stylus is moved along the upper portion 49, e.g., the gauge continues to read zero, it can be concluded that the shaft 39 has been ground to the proper taper, i.e., the uppermost portion 49 and the gauge surface 67 are coplanar. In addition, by verifying the taper of the shaft at each end, the distance from the flange 43 to the gaugeline 45 is also checked.

In a preferred embodiment of the present invention, the shafts to be measured have a taper of 3.5 inches per linear foot. Thus, angle A is approximately equal to 16° 36' and angles B and C are approximately equal to 8° 18'. Various different diameter shafts having such a taper include #30, 35, 40, 45, 50 and 60, all commonly referred to as NMTB milling machine tapers. For purposes of illustration, and not meant as limiting the present invention, the height of the upper gauge surface 67 of the gauge block 61 resting on the gauge block surface 51 corresponds to a #50 shaft while the upper gauge surface of the gauge block 54 resting on the gauge block surface 53 represents a #45 shaft and the upper gauge surface of the gauge block 56 resting on the gauge block surface 55 represents a 190 40 shaft. In addition, for illustration only, the shaft 39 corresponds to a #50 shaft while the shaft 83 corresponds to a #40 shaft.

It will be apparent to those skilled in the art that although only three gauge block surfaces 51, 53, 55 are shown, additional gauge block surfaces could be employed if the taper of various other diameter shafts is to be verified. Additional gauge block surfaces could be machined in the vertical sections 57, 59 or arranged in additional vertical sections disposed on the base 21. In addition, two gauge blocks could be machined which would attached to a single gauge block surface to provide a reference upper horizontal gauge surface for two different diameter shafts. These arrangements would increase the number of different diameter shafts whose taper could be verified by the apparatus of the present invention.

By employing removvble gauge blocks, for example, gauge blocks 54, 56, 61, the gauge blocks can be quickly and easily interchanged to verify the tapers of different diameter shafts. Also, careful machining of the height of a single gauge block is far less expensive than machining the horizontal gauge block surfaces to which they attached to an exact dimension. In other words, once the primary support structure of the verifying device, i.e., the two angled surfaces and the gauge block surfaces, has been constructed, the primary structure is readily adaptable for use with numerous different diameter tapered members. Also, in case of a machining error with respect to a single gauge block, only the single gauge block need be discarded rather than the entire support structure.

Turning to FIGS. 2, 4 and 6, there is disclosed an arrangement which enables smaller, shorter members to be verified. In this regard, a removable spacer block 69 is provided. The block is aligned by guide pins 71 attached to the spacer block 69 and inserted into bores 72 in the vertical section 57. The spacer block 69 is secured by a bolt 73 screwed into a tapped hole 75 formed through the second angled surface 31 into the vertical section 57. The spacer block 69 when properly positioned, presents a front face 77 which has the same angle as the second angled surface 31. In other words, the front face 77 is parallel to the surface which lies flush against the second angled surface 31 and thereby redefines the second surface at a different location. The spacer block 69 is employed when the length of the tapered shaft to be verified is shorter than the length of the first angled surface 25 from the first edge 27 to the second edge 29.

As can be seen in FIGS. 4 and 6, a recess 79 is provided in the first angled surface 25 which will accommodate a cylindrical end 81 of a smaller tapered shaft 83. The recess 79 assures that the tapered surface of the shorter shaft 83 will lie against the two angled surfaces 25 and 77 along the entire length of the taper. By providing the relief 79 on the first angled surface 25 instead of shortening the entire first angled surface 25, longer shafts can be easily accommodated against the angled surfaces 25, 31 with the assurance that substantially the entir length of the tapered surface of the shaft will be in contact with the two angled surfaces. In other words, by providing the recess 79 and the spacer 69, the apparatus of the present invention is readily adaptable to a larger number of members having various different lengths and diameters.

The method as applied to the smaller, shorter shaft 83 is essentially the same as the method as applied to the shaft 39. The spacer block 69 is secured to the second angled surface 31 by bolt 73. The zero setting of the dial indicator gauge 91 is accomplished by placing the stylus 93 on the upper gauge surface of the gauge block 56 secured to the gauge block surface 55 rather than the gauge surface 67 as was the case for the shaft 39. The shaft 83 is placed against the surfaces 25 and 77 with the cylindrical section 81 of the shaft 83 disposed in the recess 79. The stylus 93 is then placed at various locations along an upper surface 84 of the shaft 83 and the readings obtained therefrom are compared to the zero setting obtained from the upper gauge surface of the gauge block 56.

It may be advantageous to employ a second rest button beneath the front edge 27 of the surface 25 to accommodate a wide range of different diameter tapered shafts to be verified by the method and apparatus of the present invention. This would be desirable if a single rest button could not be arranged so that it would abut a flange, if available, on each of the various diameter tapered members.

The principles and preferred embodiments of the present invention have been described in the foregoing specification. However, the invention which is intended to be protected is not to be construed as limited to the particular embodiments disclosed. The embodiments are to be regarded as illustrative rather than restrictive. Variations and changes may be made by those skilled in the art without departing from the spirit of the invention. Accordingly, it is expressly intended that all such variations and changes which fall within the spirit and the scope of the present invention as defined in the appended claims be embraced thereby.

What is claimed is:

1. Apparatus adapted for use with a gauge to position a tapered member so that the taper of a tapered surface thereof may be detected and verified by the gauge, said apparatus comprising:
   first surface means;
   second surface means extending at an angle relative to a first longitudinal axis of said first surface means, said angle comprising one half the included angle of the desired taper;
   with the tapered surface positioned against said first and second surface means and with the taper corresponding to the desired taper:
      said first axis is coplanar with a centerline of said member, and
      a portion of said tapered surface remote from said first surface means is disposed at a preselected level suitable for gauge detection; and
   a surface fixed relative to said first and second surface means and disposed at said preselected level for being contacted by a gauge to enable the gauge to be preset.

2. Apparatus according to claim 1 wherein said first surface means is oriented at an angle relative to horizontal equal to the included angle of the desired taper, such that said remote portion of said tapered surface is oriented horizontally at said preselected level.

3. Apparatus according to claim 1 including a plurality of additional surfaces disposed at different levels to verify the tapers of tapered members of different size.

4. Apparatus for use with a movable gauge to position a tapered shaft so that the taper of a tapered surface thereof can be contacted and verified by the gauge, said apparatus comprising:
   a base adapted to be placed on a horizontal surface;
   a first angled surface on the base forming a first acute angle with the horizontal equal to the included angle of the desired taper;
   a second angled surface, said second surface forming an angle with said first surface equal to one half said included angle such that, with the taper being accurate, positioning of the tapered surface against said first and second surface serves to orient horizontally at a predetermined level, a portion of said tapered surface remote from said first surface, and
   a horizontal surface fixed relative to said first and second surfaces and disposed at said predetermined level to enable a gauge to be preset prior to contacting said remote portion.

5. The apparatus of claim 4 further comprising rest means for abutting a flange on the shaft, said rest means being arranged adjacent a lower edge of the first angled surface.

6. The apparatus of claim 5 wherein the rest means comprises a button extending outwardly beneath said lower edge at a predetermined angle to the horizontal.

7. The apparatus of claim 4 further comprising means for redefining the second angled surface at a different location to accomodate smaller tapered shafts.

8. The apparatus of claim 7 wherein the means for redefining comprises a spacer block having two parallel surfaces, one of the surfaces being in contact with the second angled surface.

9. The apparatus of claims 4 or 7 further comprising relief means for receiving a cylindrical end of the tapered shaft, said relief means being arranged along a side of the first angled surface opposite the second angled surface and adjacent to a higher edge of the first angled surface.

10. The apparatus of claim 4 wherein the horizontal surface is arranged on a vertical portion, said vertical portion including said second angled surface.

11. The apparatus of claim 4 wherein the horizontal surface is on a gauge block with is removably secured to a gauge block surface.

12. The apparatus of claim 11 wherein the gauge block is removably secured by a screw engaging a tapped hole in the gauge block surface.

13. The apparatus of claim 4 further comprising:
   a shaft whose taper is to be verified arranged against said first and second angled surfaces; and
   a gauge for comparing the height of the horizontal surface with a height of an upper portion of the tapered surface.

14. The apparatus of claim 12 wherein the height of the horizontal surface corresponds to the diameter of a properly tapered shaft at a gaugeline of the shaft.

15. The apparatus of claim 13 wherein the gauge means is slidable along a surface which is parallel to the upper portion of the shaft.

16. A method of verifying the taper of a tapered surface of a member comprising the steps of:
   presetting a gauge according to a preselected level of a fixed gauge surface;
   placing the tapered surface against;
      a first angled surface arranged beneath the gauge surface, said first surface forming an angle with the horizontal which is equal to the included angle of the taper,
      a second angled surface forming with a longitudinal axis of said first surface an angle equal to one half said included angle,
      an upper portion of said tapered surface being disposed at said preselected level when the taper corresponds to the desired taper;
   placing the preset gauge against the upper portion of the tapered surface;
   obtaining readings on the gauge corresponding to the upper portion of the tapered surface; and
   comparing the readings of the gauge obtained from the upper portion of the tapered surface of the present value obtained from the gauge surface to verify the taper.

17. A method of verifying the taper of a tapered surface of a member comprising the steps of:
presetting a gauge according to a level of a gauge surface;
placing the tapered surface against:
a first angled surface arranged beneath the gauge surface, said first surface forming an angle with the horizontal which is equal to the included angle of the taper, and
a second angled surface forming with a longitudinal axis of said first surface an angle equal to one half said included angle;
placing the preset gauge against an upper portion of the tapered surface;
moving the gauge along a surface parallel with the upper portion of the tapered surface over the entire length of the tapered surface of the member;
obtaining readings on the gauge corresponding to a a plurality of locations along the upper portion of the tapered surface; and
comparing the readings of the gauge obtained from the plurality of locations along the upper portion of the tapered surface to the preset value obtained from the gauge surface.

18. A method of verifying the taper of a tapered surface of a member comprising the steps of:
presetting a gauge according to a level of a gauge surface;
placing the tapered surface against:
a first angled surface arranged beneath the gauge surface, said first surface forming an angle with the horizontal which is equal to the included angle of the taper, and
a second angled surface forming with a longitudinal axis of said first surface an angle equal to one half said included angle;
placing the preset gauge against an upper portion of the tapered surface;
obtaining readings on the gauge corresponding to the upper portion of the tapered surface; and
comparing the readings of tha gauge obtained from the upper portion of the tapered surface of the preset value obtained from the gauge surface;
abutting a flange on the member against a rest button arranged beneath an edge of the first angled surface; and
obtaining readings on the gauge at the extreme ends of the tapered surface in order to verify the distance between the flange and a gaugeline on the member.

* * * * *